United States Patent

[11] 3,576,202

| | | |
|---|---|---|
| [72] | Inventor | David L. Spanjer<br>Willowdale, Ontario, Canada |
| [21] | Appl. No. | 777,003 |
| [22] | Filed | Nov. 19, 1968 |
| [45] | Patented | Apr. 27, 1971 |
| [73] | Assignee | Massey-Ferguson Services N.V.<br>Curacao, Antilles, Netherlands |
| [32] | Priority | Dec. 4, 1967 |
| [33] | | Canada |
| [31] | | 006,688 |

[54] TREE-HARVESTING APPARATUS
10 Claims, 16 Drawing Figs.

[52] U.S. Cl. .................................................. 144/3,
  144/34, 214/3
[51] Int. Cl. ................................................... A01g 23/02
[50] Field of Search ....................................... 144/2 (21),
  3 (4), 34, 34 (1—6), 309 (34); 214/3

[56] References Cited
UNITED STATES PATENTS

| 1,793,545 | 2/1931 | Rocher | 144/3 |
|---|---|---|---|
| 1,797,063 | 3/1931 | Meister | 144/3 |
| 3,327,745 | 6/1967 | Meece et al. | 144/34 |
| 3,460,594 | 8/1969 | Burkhalter | 144/34 |
| 1,592,656 | 7/1926 | Corona | 144/3 |

FOREIGN PATENTS

| 138,419 | 12/1960 | U.S.S.R. | 144/309 |
|---|---|---|---|
| 646,865 | 10/1962 | Italy | 214/3 |

*Primary Examiner*—Gerald A. Dost
*Attorney*—Gerhardt, Greenlee & Farris

ABSTRACT: A log skidder is provided with an articulated boom structure which mounts a tree-felling power shear. The boom structure also carries a cable-attaching arrangement including the winch cable, a plurality of fasteners attached to the cable and means for attaching a fastener to a tree as it is felled by the shear. The skidder can move from tree to tree, until a full load is obtained, whereupon all the felled trees are winched into close proximity to the skidder for subsequent transporting without the operator leaving his seat.

Fig. 7

INVENTOR.
DAVID L. SPANJER
BY Tweedale & Gerhardt
ATTORNEYS.

INVENTOR.
DAVID L. SPANJER
BY Tweedale & Gerhardt
ATTORNEYS.

Fig. 12

INVENTOR.
DAVID L. SPANJER
BY
Tweedale & Gerhardt
ATTORNEYS.

TREE-HARVESTING APPARATUS

This invention relates to tree-harvesting machines, and is particularly concerned with a vehicle-mounted felling and "choking" apparatus in the form of a cutter and cable-attaching mechanism which can be operated from the operator's station, and which can be used to sequentially fell a plurality of trees and then transport the trees simultaneously to a collection area while they are attached to the cable.

In accordance with the present invention, a cutter is carried by an articulated boom supported on a vehicle, the vehicle being provided with a winch having a cable mounted thereon. A plurality of cable-attaching devices are carried by the boom. The cutter is power operated by remote control from the vehicle seat or cab, and the cable-attaching devices are sequentially actuated, by the same or another power means, simultaneously with or prior to the actuation of the cutter to attach the cable to the trunk of the tree as it is felled by the cutter.

The objects, advantages and features of the invention will be apparent from the following description, taken in connection with the accompanying drawings in which.

Figure 1:
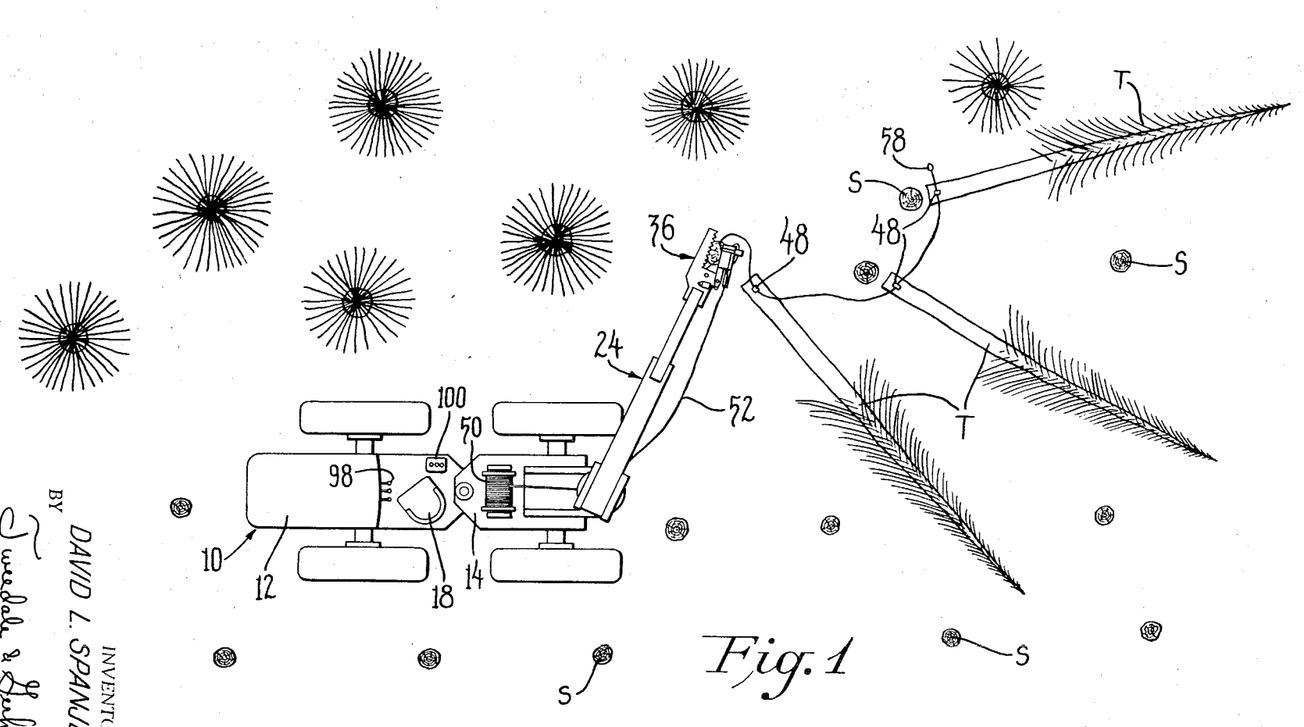
FIG. 1 is a plan view of a machine embodying the invention illustrating its use in a field of trees.
Figure 2:
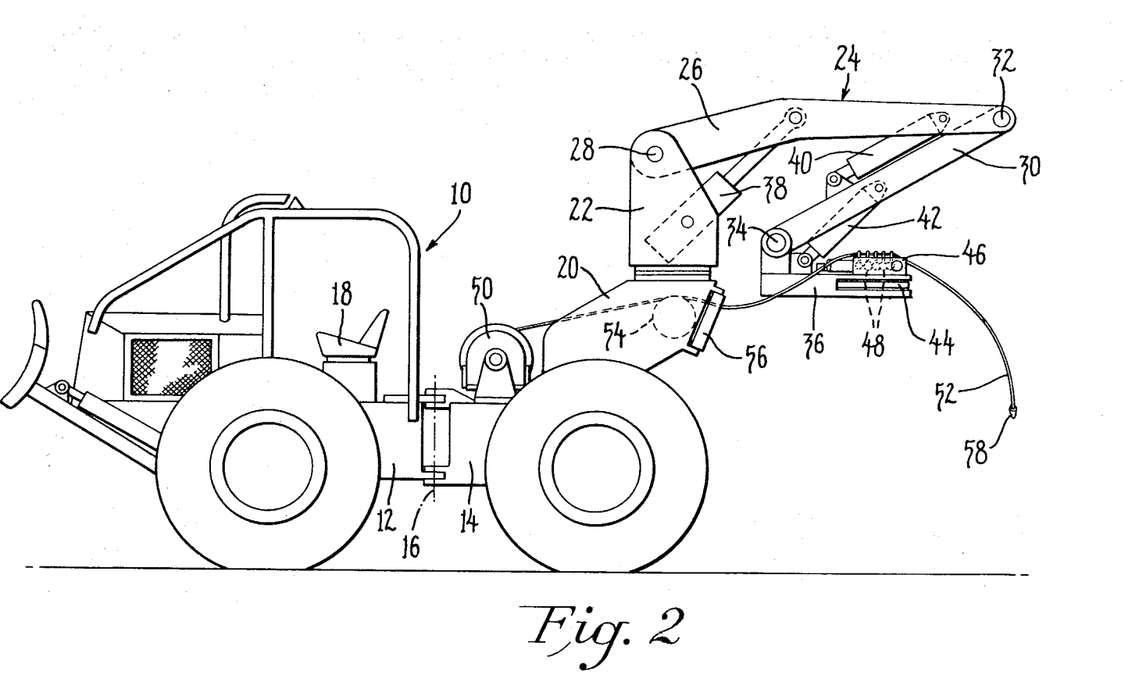
FIGS. 2 through 8 are elevational views of the machine in FIG. 1 sequentially illustrating the felling and choking operation.

In FIG. 2, reference numeral 10 collectively designates an articulated vehicle having a front section 12 and a rear section 14 connected together for pivotal movement about a vertical axis 16. The vehicle 10 is provided with a swivel seat 18 for the operator to permit him to have easy access to steering and driving controls 98 as well as the control handles 100 for operating the felling and choking mechanism (FIG. 1).

A pedestal 20 is mounted on the rear section 14, and a boom support 22 is rotatably supported on the pedestal in a conventional manner. Mounted on the boom support is a boom assembly 24 having an arm 26 pivotally connected at 28 to the boom support, and an arm 30 pivotally connected at 32 to the free end of arm 26. Felling and choking apparatus including a cutter 36 is pivotally mounted at 34 on the free end of arm 30. Arm 26 is actuated about pivot point 28 by a hydraulic ram 38 having its cylinder portion pivotally connected with the boom support 22 and its piston pivotally connected to arm 26 in a conventional manner. Arm 30 is caused to pivot about its pivot connection 32 with arm 26 by a similar hydraulic ram 40 connected between arms 26 and 30, and the felling and choking mechanism is actuated about pivot point 34 by a similar hydraulic ram 42.

The cutter 36 includes a blade 44. The choking apparatus includes a magazine 46 for supporting a plurality of the stakes 60 or spikes 48 each of which is formed with an eyelet 60 for receiving a cable 52 wound around a winch 50 carried by rear section 14 of the vehicle. Cable 52 passes over a horizontal idler roller 54 mounted on pedestal 20 and between a pair of vertical guide rollers 56. An enlarged stop member 58 is mounted on the free end of cable 52 to prevent its disengagement from the choking stakes by blocking passage of the end of the cable through the eyelets 60.

Figure 3:
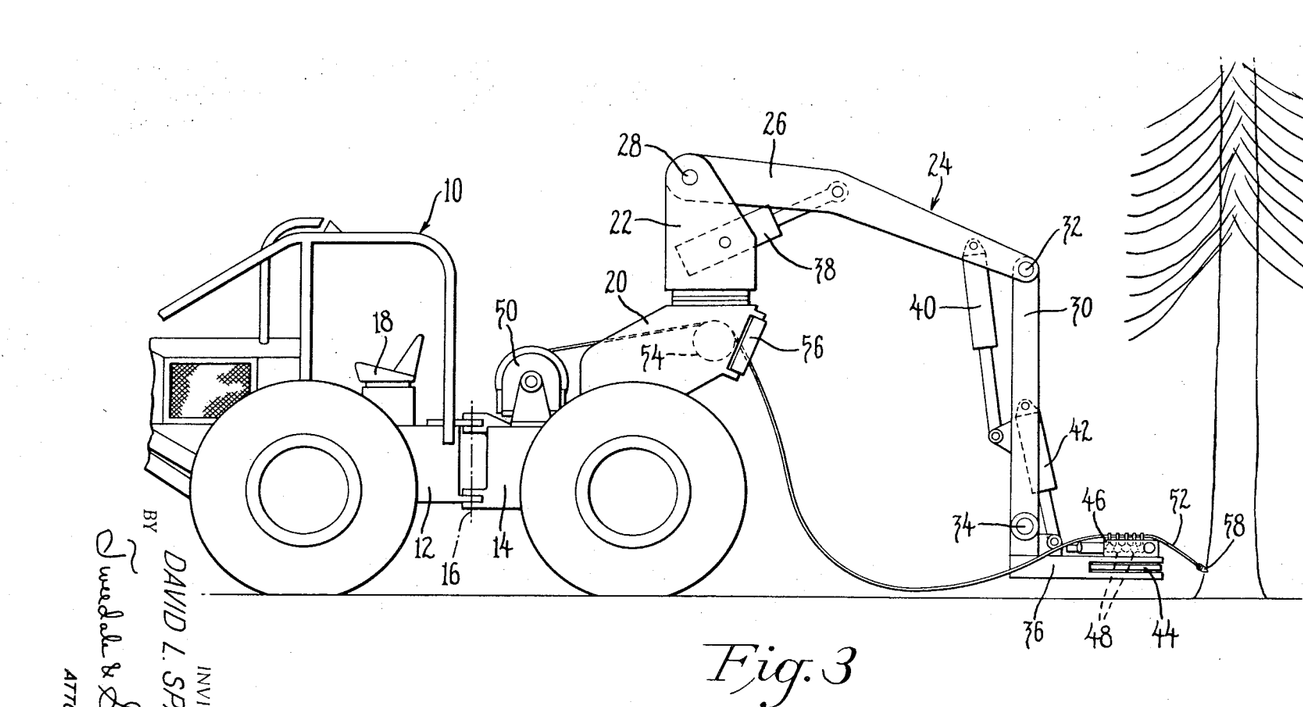
Figure 4:
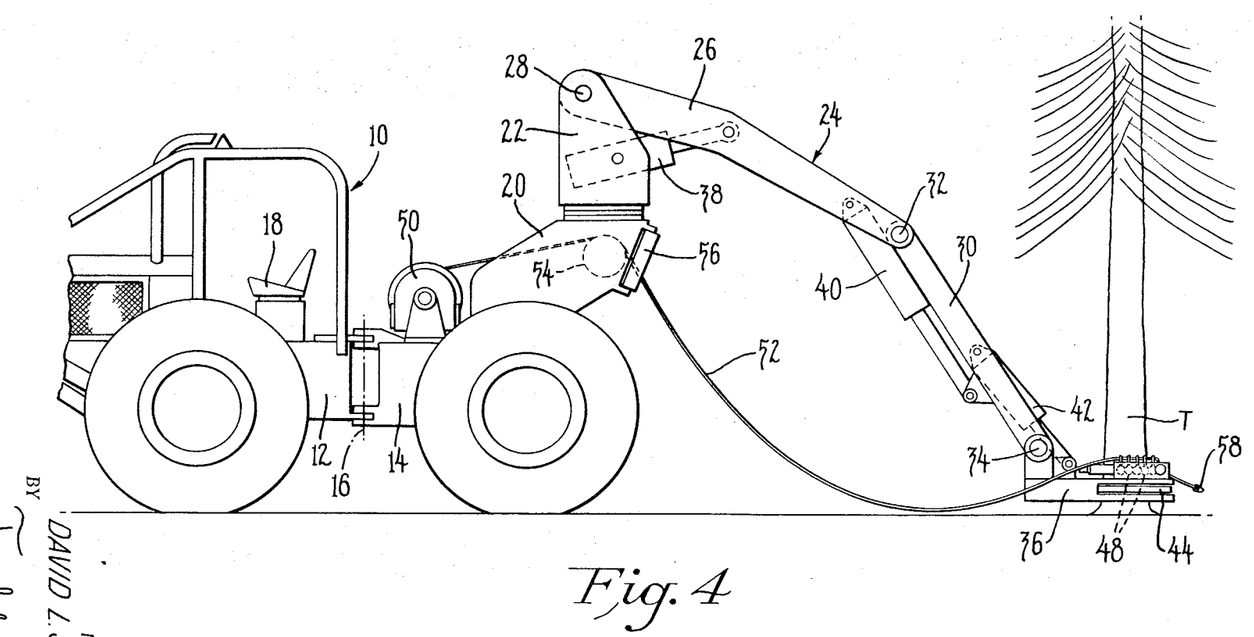
Figure 5:
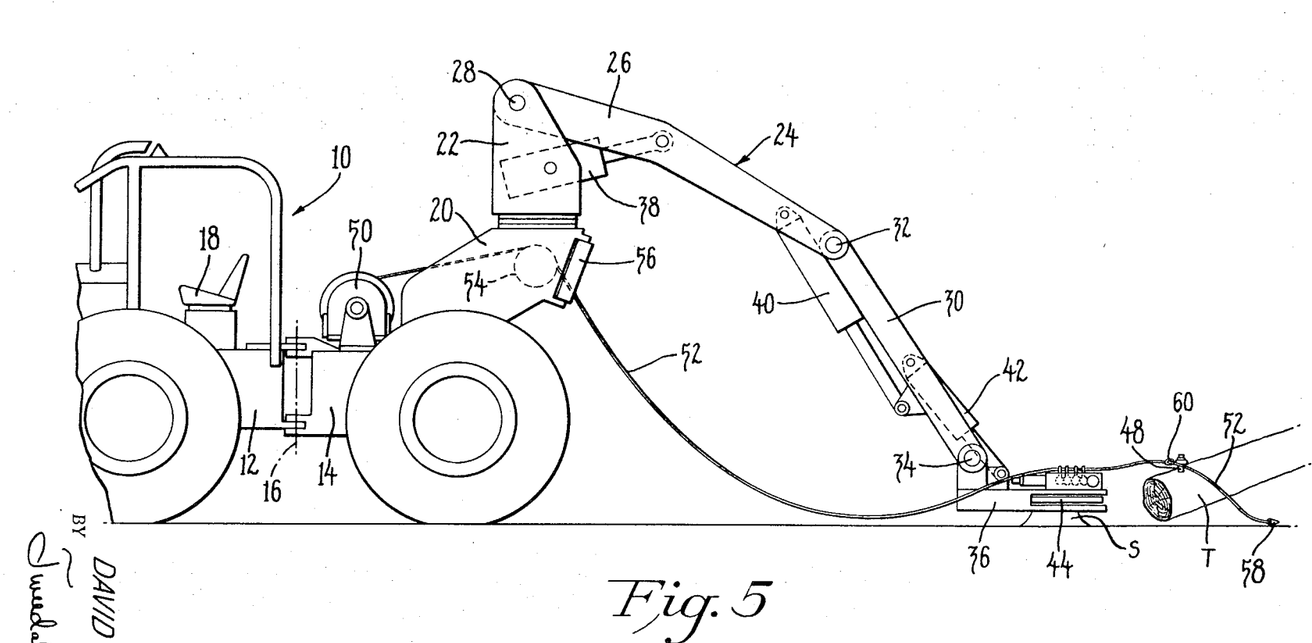
Figure 6:
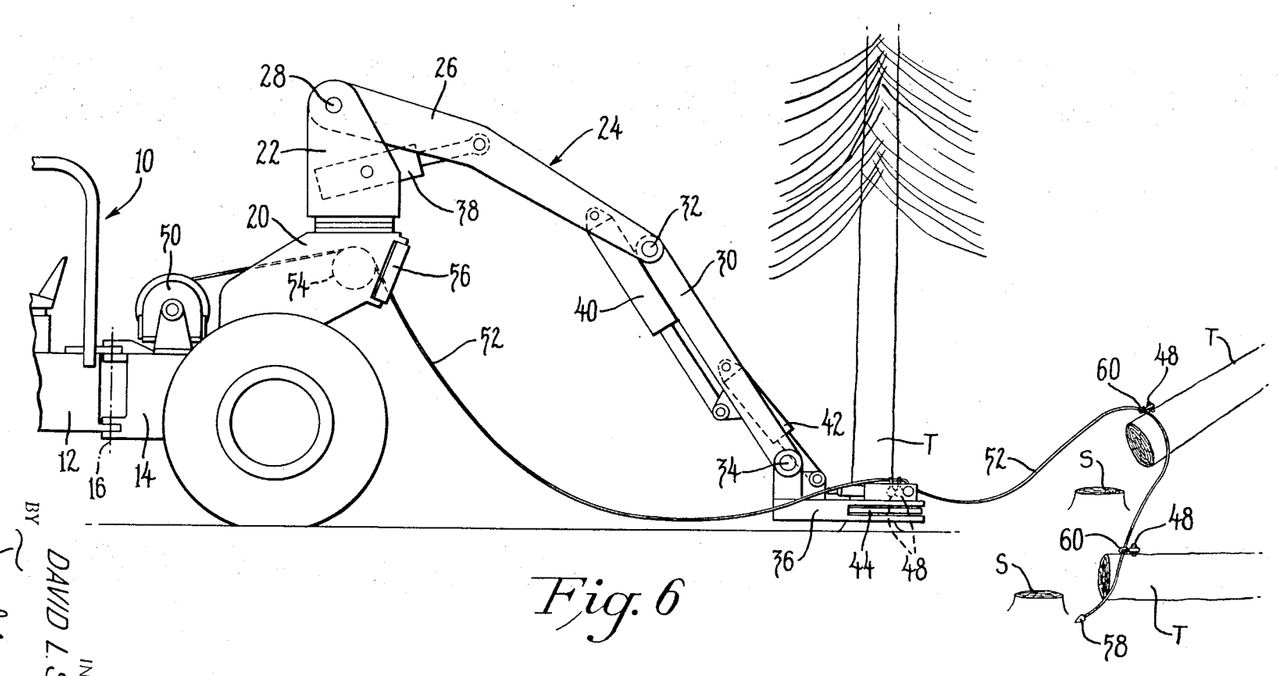

In FIG. 2, the boom is in its retracted position for transport. In FIG. 3, the boom is extended to move the cutter toward a standing tree until it reaches the position shown in FIG. 4 in which the blade is in a position to sever the tree. The operator manipulates the hydraulic control handles 100 (FIG. 1) to cause the cutter blade to sever the tree, and also hydraulically drive the leading stake 48 from the magazine 46 into the trunk of the tree. As the tree falls, the stake 48 in the tree is carried by the tree out of the magazine as shown in FIG. 5. The winch 50 is in a free-spooling condition to permit the cable to freely play out from the winch.

Figure 7:
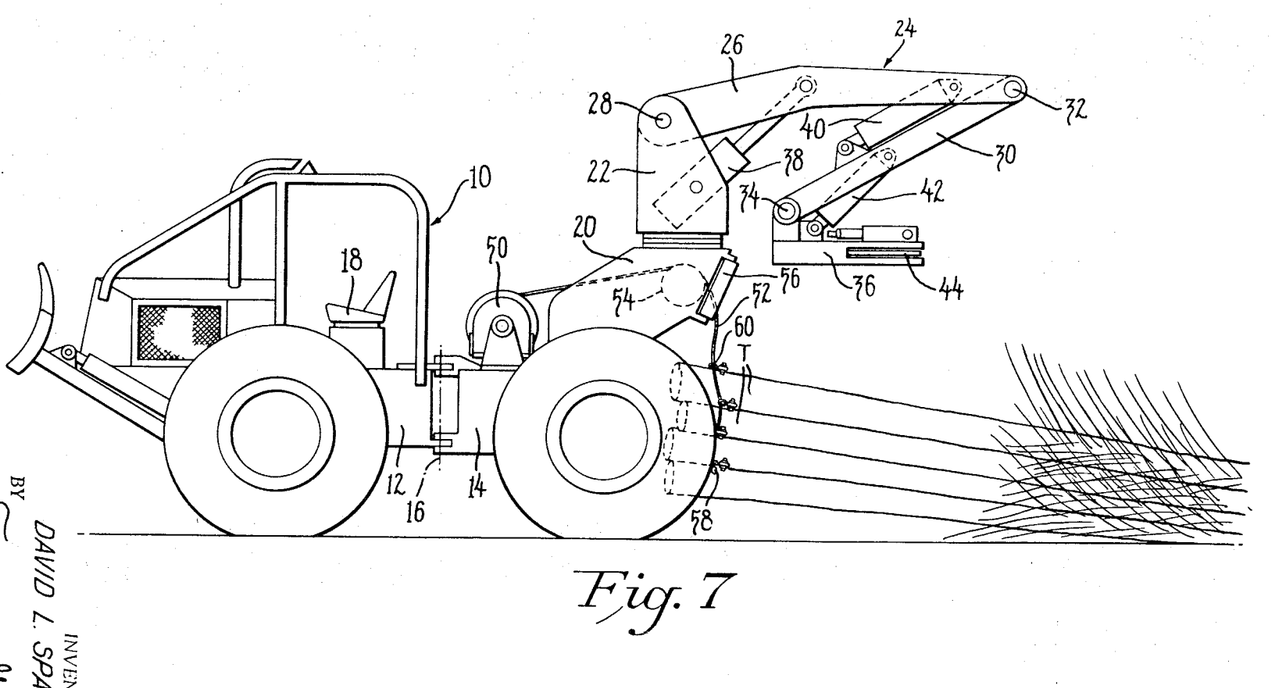
Figure 8:
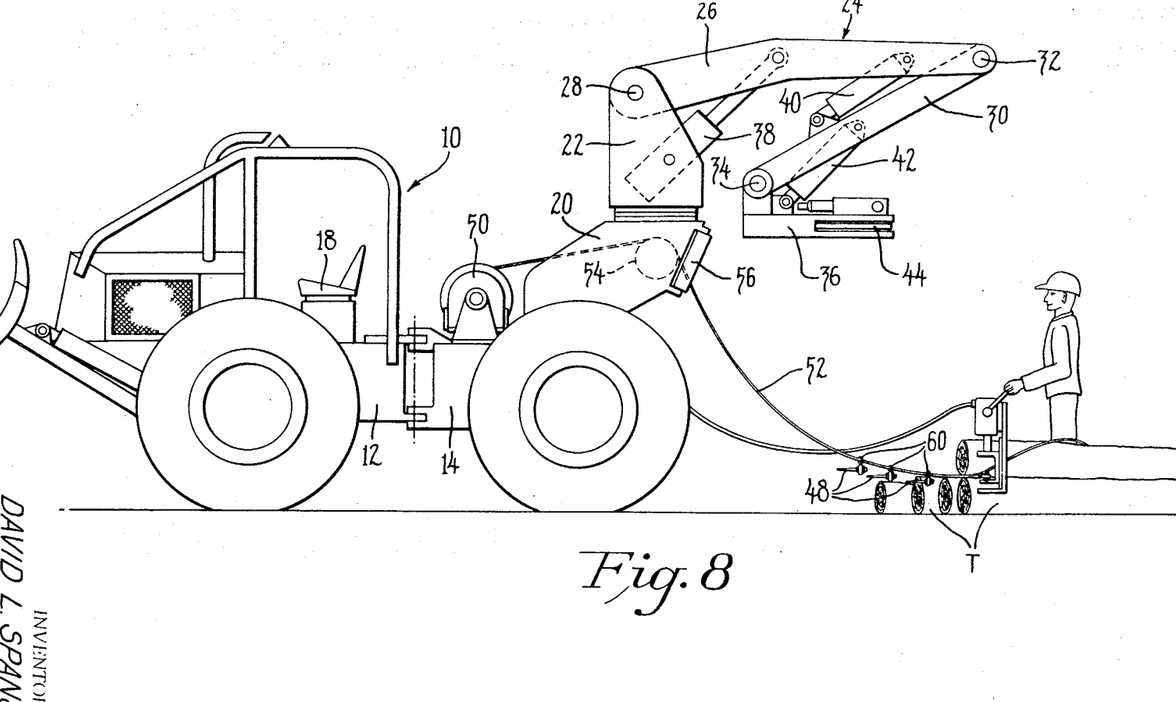

The boom is then retracted and the cutter is moved to another tree to repeat the above operation until all of the stakes 48 in the magazine 46 have been expended or until the desired quantity of trees have been felled and choked. The cable is then hauled in by the winch as shown in FIG. 7 and the felled trees are transported by the vehicle to a collection area. The stakes are then removed such as by a hydraulic expander as shown in FIG. 8 and are returned to the magazine. The entire operation shown in FIGS. 2 through 7 is carried out with the driver remaining at his station on the vehicle. The cutter and choking stakes are operated by remote control from the operator's station on the vehicle.

Figure 9:
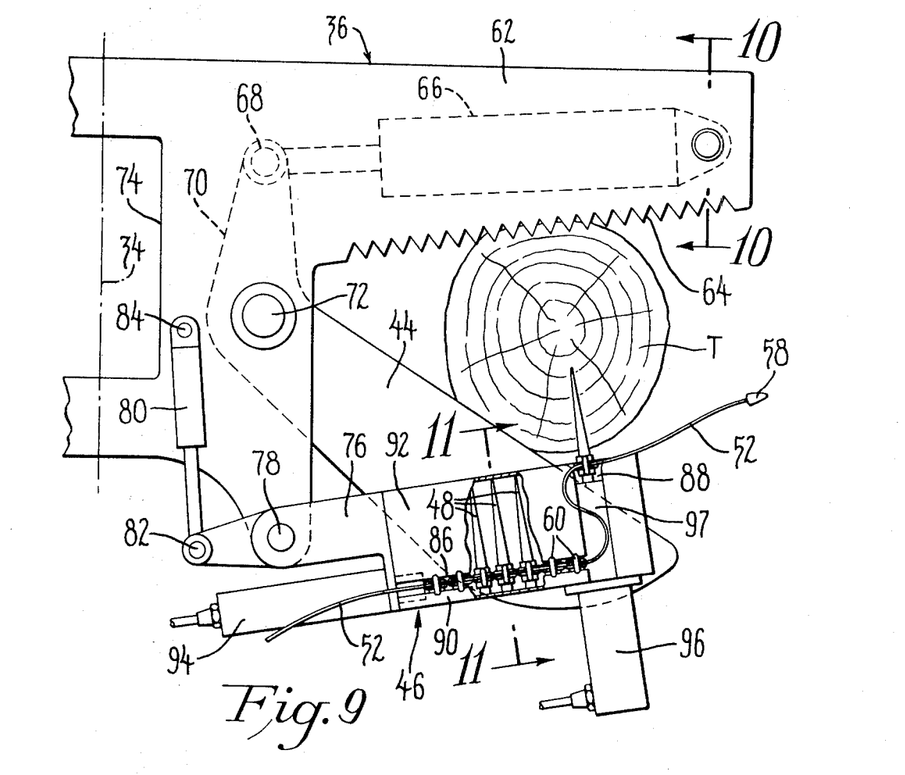
FIG. 9 is a plan view of a cutting and choking mechanism.
Figure 10:
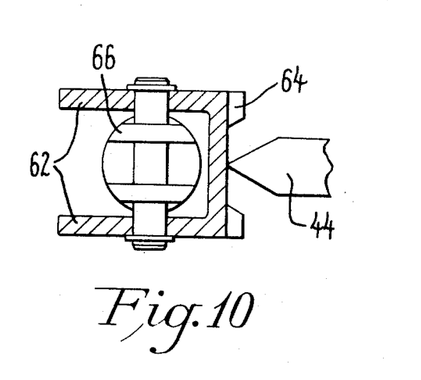
FIGS. 10 and 11 are sectional views taken on lines 10–10 and 11–11 respectively of FIG. 9.
Figure 11:
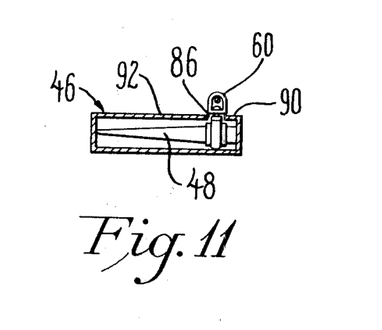

FIGS. 9 through 11 illustrate one suitable form of cutting and attaching mechanism. The cutter 36 illustrated in FIGS. 9 through 11 includes a pair of vertically spaced frame members 62 formed along their inner edges with serrations or teeth 64 for gripping the trunk of the tree to be felled. The blade 44 is actuated by a hydraulic ram 66 having a cylinder pivotally supported on frame member 62 and its piston rod pivotally connected at 68 with an arm 70 of blade 44. Blade 44 is pivotally mounted by a pin 72 to an arm portion 74 of frame member 62. Extension of the ram 66 causes counterclockwise rotation of blade 44 about pin 72 in a direction to sever the tree. Conversely, retraction of the ram causes clockwise rotation of blade 44 as viewed in FIG. 9 to open the cutter.

The magazine 46 for the stakes 48 is mounted on a support 76 which is pivotally mounted at 78 on the arm portion 74 of the cutter frame. Support member 76 is pivotally connected at 82 with the piston rod of a hydraulic ram 80, the cylinder of which is pivotally mounted at 84 on frame 62. The magazine 46 includes a housing having a top wall formed with an elongated slot 86 for receiving the eyelets 60 of the stakes shown in FIG. 11. The stakes are received between the top and bottom walls of the magazine housing and are held in place by portions 90 and 92 of the top wall on either side of the slot 86. Slot 86 communicates with an open-ended chamber 88 which permits the leading stake 48 to be ejected axially from the magazine.

The stakes 48 are caused to sequentially advance toward the chamber 88 by the plunger of a hydraulic ram 94 which, when pressurized, urges the stakes 48 toward chamber 88. For reloading the magazine, the plunger of ram 94 can be retracted by relieving the pressure in the ram. The plunger may be spring loaded toward a retracted position, or alternatively ram 94 can be of the double-acting type.

The stakes 48 are driven into the tree trunk by a hydraulic ram 96 mounted in axial alignment with chamber 88. When pressure is supplied to the cylinder of ram 96, the plunger 97 extends into chamber 88 to drive the leading stake 48 into the tree trunk.

The various rams can be controlled by the operator simultaneously or sequentially to most efficiently fell and attach the cable to the tree.

Figure 12:
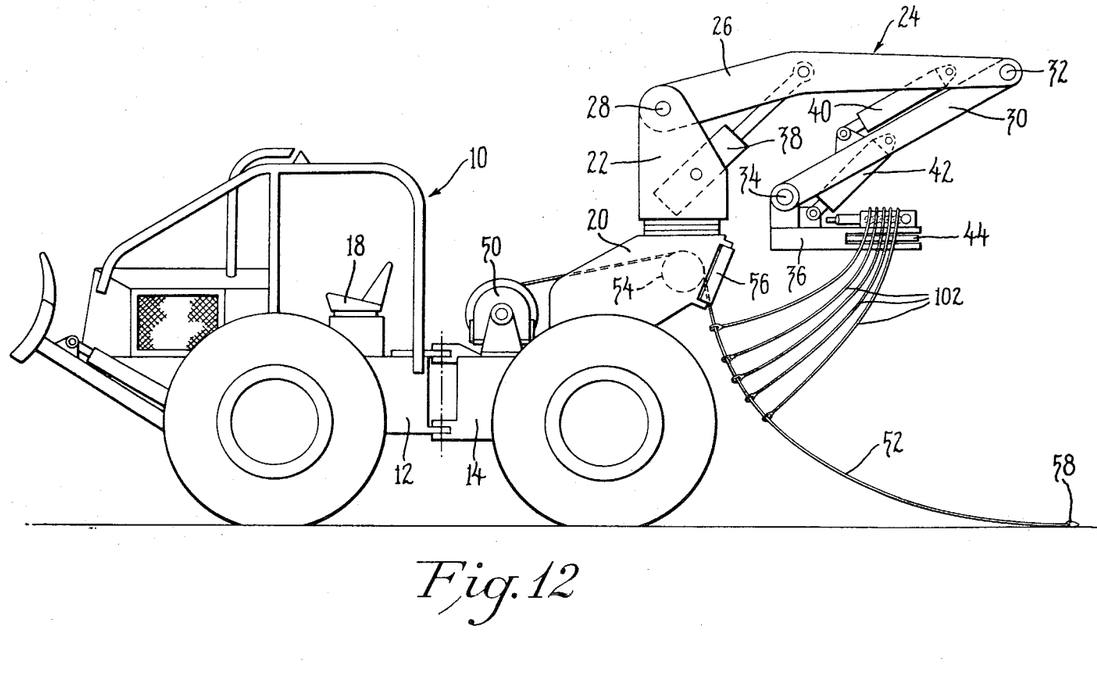
FIG. 12 is an elevational view similar to FIGS. 2 through 8 illustrating a modified arrangement of the cable attaching mechanism.

In FIG. 12, short lengths of cables 102 are attached to each stake. The short cables 102 are in turn slideably attached to main cable 52. This arrangement enables the operator to fell less than a full complement of trees and winch them into the normal transport position. The vehicle can then move to another location with the felled trees where the load can be dropped and the operation continued until a full load of trees is attached to the cable.

Figure 13:
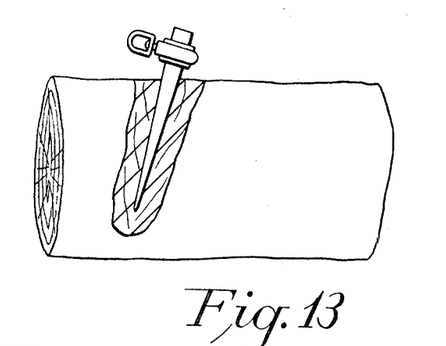
FIGS. 13 through 16 illustrate alternative forms of choking devices.
Figure 14:
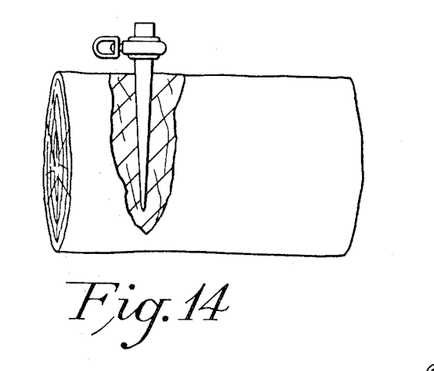
Figure 15:
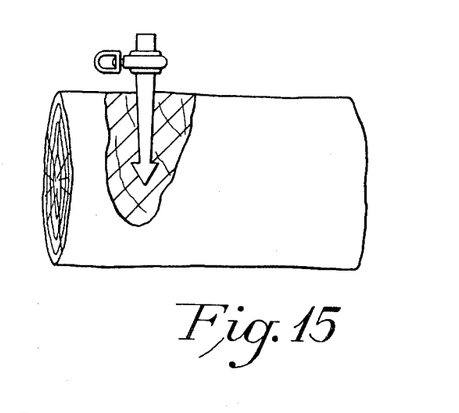

FIGS. 13, 14 and 15 illustrate the various alternative forms of stakes for attaching the cable to the tree trunk.

Figure 16:
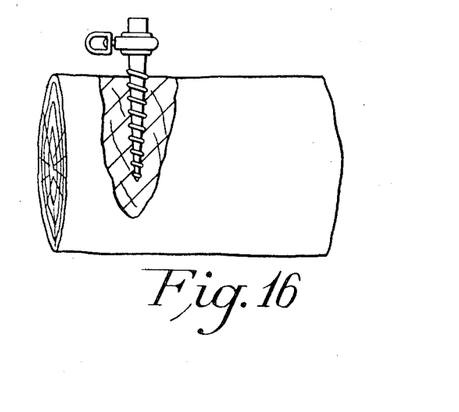

FIG. 16 illustrates a threaded stake which, if desired, can be embedded into the tree by a power wrench or similar tool instead of by a ram.

As an alternative arrangement, the stakes can be driven into the tree trunk by an explosive charge instead of the rams, and the magazine can be spring loaded.

While specific forms of the inventions have been illustrated and described, it should be understood that the invention is not limited to the exact constructions shown.

The use of other types of felling and cable-attaching devices will be apparent to those skilled in the art, all of which fall within the scope and spirit of the invention.

I claim:

1. Apparatus for harvesting trees comprising a self-propelled vehicle having a winch with cable means wound thereon, a cutter carried by the vehicle for felling standing trees, power means for actuating the cutter to fell a tree and attach the cable means to the trunk of the felled tree permitting the cable means to be played out from the winch as the vehicle advances from one to the other of a plurality of standing trees to sequentially fell and attach the cable means to each of the plurality of trees whereby the felled trees can subsequently be hauled in by the winch and transported by the vehicle to a collection area.

2. Apparatus as claimed in claim 1 wherein the cable means comprise a cable and further including a plurality of cable attachment devices carried by the cutter and slideably connected with the cable, said cable attachment devices being under the control of the power means such that each attachment device connects the cable with a felled tree trunk.

3. Apparatus as claimed in claim 2 wherein said cable attachment devices comprise stakes which are driven into the felled tree trunk by power means.

4. Apparatus as claimed in claim 3 wherein the cutter includes a frame, and further including a magazine supported on the cutter frame for holding a plurality of said stakes.

5. Apparatus as claimed in claim 4 wherein said stakes are provided with eyelets for slideably receiving the cable and the end of the cable is provided with a stop member for blocking passage of the cable end through the eyelets to prevent disconnection of the cable from the stakes.

6. Apparatus as claimed in claim 5 wherein the magazine is pivotally supported on the cutter frame and is pivotal to direct a stake toward the center of the tree being felled.

7. Apparatus as claimed in claim 6 wherein said magazine includes a housing with a slot formed in the top wall for receiving the eyelets of the stakes received in he magazine, said slot terminating in a chamber permitting axial ejection of stakes from the magazine.

8. Apparatus as claimed in claim 7 further including a hydraulic ram mounted on said magazine in axial alignment with said chamber for ejecting a stake from the chamber and driving it into the trunk of a tree during the operation of the cutter.

9. A tree-harvesting machine comprising a cutter for felling a tree, a winch, a cable operatively wound on the winch, and power means associated with the cutter for attaching the cable to the tree as the tree is being felled by the cutter to enable movement of the tree by the winch after it is felled.

10. Apparatus for harvesting trees comprising a cutter for felling a tree, power-driven cable means, and power attachment means associated with the cutter for attaching the cable means to the tree as the tree is being felled by the cutter to enable movement of the tree by the power-driven cable means after it is felled.